United States Patent
Haught et al.

(10) Patent No.: US 6,584,467 B1
(45) Date of Patent: *Jun. 24, 2003

(54) METHOD AND APPARATUS FOR OBTAINING DATA FROM VENDORS IN REAL TIME

(75) Inventors: Gerald R. Haught, Cary, IL (US); Ernest M. Pihl, Jr., Lake Barrington, IL (US); James M. Batman, Vernon Hills, IL (US); Karl M. Babij, Conway, AR (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/358,463

(22) Filed: Jul. 22, 1999

Related U.S. Application Data

(63) Continuation-in-part of application No. 09/153,155, filed on Sep. 15, 1998, which is a continuation of application No. 08/569,615, filed on Dec. 8, 1995, now Pat. No. 5,809,478.

(51) Int. Cl.[7] .............................................. G06F 17/60
(52) U.S. Cl. ..................... 707/10; 709/200; 709/201; 709/217; 707/3; 707/4; 707/104.1; 705/4
(58) Field of Search ................. 705/1, 4, 38; 709/200, 709/201, 217; 707/3, 4, 10, 104.1

(56) References Cited

U.S. PATENT DOCUMENTS

| | | | |
|---|---|---|---|
| 4,642,768 A | 2/1987 | Roberts | 364/408 |
| 4,730,252 A | 3/1988 | Bradshaw | 364/403 |
| 4,831,526 A | 5/1989 | Luchs et al. | 364/401 |
| 4,975,840 A | 12/1990 | DeTore et al. | 364/401 |
| 5,274,547 A * | 12/1993 | Zoffel et al. | 705/38 |
| 5,611,052 A | 3/1997 | Dykstra et al. | 395/238 |
| 5,617,418 A * | 4/1997 | Shirani et al. | 370/465 |
| 5,684,945 A * | 11/1997 | Chen et al. | 714/20 |
| 5,966,695 A * | 10/1999 | Melchione et al. | 705/10 |

FOREIGN PATENT DOCUMENTS

JP         07239885 A    * 12/1995

OTHER PUBLICATIONS

Peter Data warehouse unlocking production system data; Feb. 1994; Network World v11n9 PP: 28; Dialog File 15, Accession No. 00848352.*

Schmidt "Prism Solutions Automates Data Warehouse Development for the Client/Server"; May 1993, Dateline: SanFrancisco, CA; Dialog file 621, Accession No. 00358414.*

Hatch, Denison, Dial'og (R), "The Assisted Suicide of Database Marketing," 1997, UMI, 4 pp.

* cited by examiner

Primary Examiner—Tariq R. Hafiz
Assistant Examiner—Romain Jeanty
(74) Attorney, Agent, or Firm—Finnegan, Henderson, Farabow, Garrett & Dunner, LLP

(57) ABSTRACT

A system and method of controlling a computer network to obtain information needed to render risk evaluative decisions from vendors in real time. The information may be obtained for agents preparing insurance applications or for an automated application processing system. Agents or automated application processing systems require access to an external vendor to obtain information about a customer, such as car accident or credit records. The request for data must be formatted to be read by the vendor system, which sends the responding data in real time. This responding data is forwarded to the requesting party for further processing of the application.

14 Claims, 5 Drawing Sheets

METHOD AND APPARATUS FOR OBTAINING DATA FROM VENDORS IN REAL TIME

I. RELATED APPLICATIONS

This application is a continuation-in-part of U.S. patent application Ser. No. 09/153,155 filed Sep. 15, 1998 which is a continuation of U.S. patent application Ser. No. 08/569,615 filed Dec. 8, 1995, now U.S. Pat. No. 5,809,478, which is related to U.S. patent application Serial No. 08/374,484, filed Jan. 17, 1995, all of which are incorporated herein by reference.

II. BACKGROUND OF THE INVENTION

The present invention relates generally to computer decision-making systems, and in particular to the use of computer networks to gather information relevant to insurance-related decisions.

Insurance companies issue policies to insure against different types of risk. The amount they charge for such policies should accurately reflect the risk insured against so the companies can offer profitable, but competitively priced, policies. Thus, accurate risk evaluation is essential for such companies to make rational business decisions.

Historically, risk evaluation was performed by underwriters who are individuals with expertise in assessing risk based on many factors. These underwriters, or "risk evaluators," work in conjunction with insurance agents to collect and analyze data representing factors affecting the risk associated with a particular customer.

Of course, the accuracy of the risk evaluation depends upon the accuracy of the data forming the basis for the evaluation. Traditionally, this data, such as driving records, credit records, and name and address records, was acquired from independent sources with their own formats and request requirements. The collection of this data and the necessary conversions between incompatible formats has proven expensive and burdensome. With the automation of risk evaluative decision-making, this expense and burden has only increased.

At the same time, customers are increasingly seeking agents able to handle all transactions knowledgeably and efficiently, anticipating future needs, and delivering core benefits expeditiously. Current systems, however, hamper efforts to achieve these goals. Agents are given limited access to information, and an unnecessarily large number of transactions are referred to the underwriting environment. As a result, risk evaluators often spend an excessive amount of time on individual risk selection, rather than on assisting agents in broader market management activities.

To reduce overhead, insurance companies now use computer systems to help risk evaluators perform their assessment. These systems facilitate communication between risk evaluators and agents, improve the speed and accuracy with which insurance policies are processed, and increase the overall quality of the insurance product purchased by consumers.

In spite of the increasing use of computers, insurance companies' efficiency is still limited. Prior agent computer systems requested information from external systems about a potential insurer using a batch processing network, such as an overnight batch exchange. Prior insurance data gathering systems did not allow for real-time or near real time gathering of data for faster insurance evaluation.

III. SUMMARY OF THE INVENTION

The present invention facilities risk evaluation using information sources that gather and return data on insurers in real time or near real time to risk evaluators or to automated risk evaluation processes.

Systems and methods consistent with the present invention control a computer network to assemble data for rendering decisions based on the data, the network including a data manager having a memory, and a data gathering system coupled to vendors of data. The data manager processes requests for data by invoking real time information interface processes to retrieve the needed additional data through the data gathering system. The data gathering system formats the request using templates based on the data vendor to be accessed. The data vendor is sent the formatted request and returns the requested data in real time. The data gathering system matches received response data with the request and delivers the data to the data manager for further processing.

In one embodiment, the data manager automatically processes applications and generates requests for data when needed to perform automatic risk evaluation.

Both the foregoing general description and the following detailed description are exemplary and explanatory. They provide further explanation of the invention as claimed.

IV. BRIEF DESCRIPTION OF THE DRAWINGS

The accompanying drawings, which are incorporated in and constitute a part of this specification, illustrate several embodiments of the invention and, together with the description, serve to explain the objects, advantages, and principles of the invention.

V. DETAILED DESCRIPTION OF THE PREFERRED EMBODIMENTS

Figure 1:
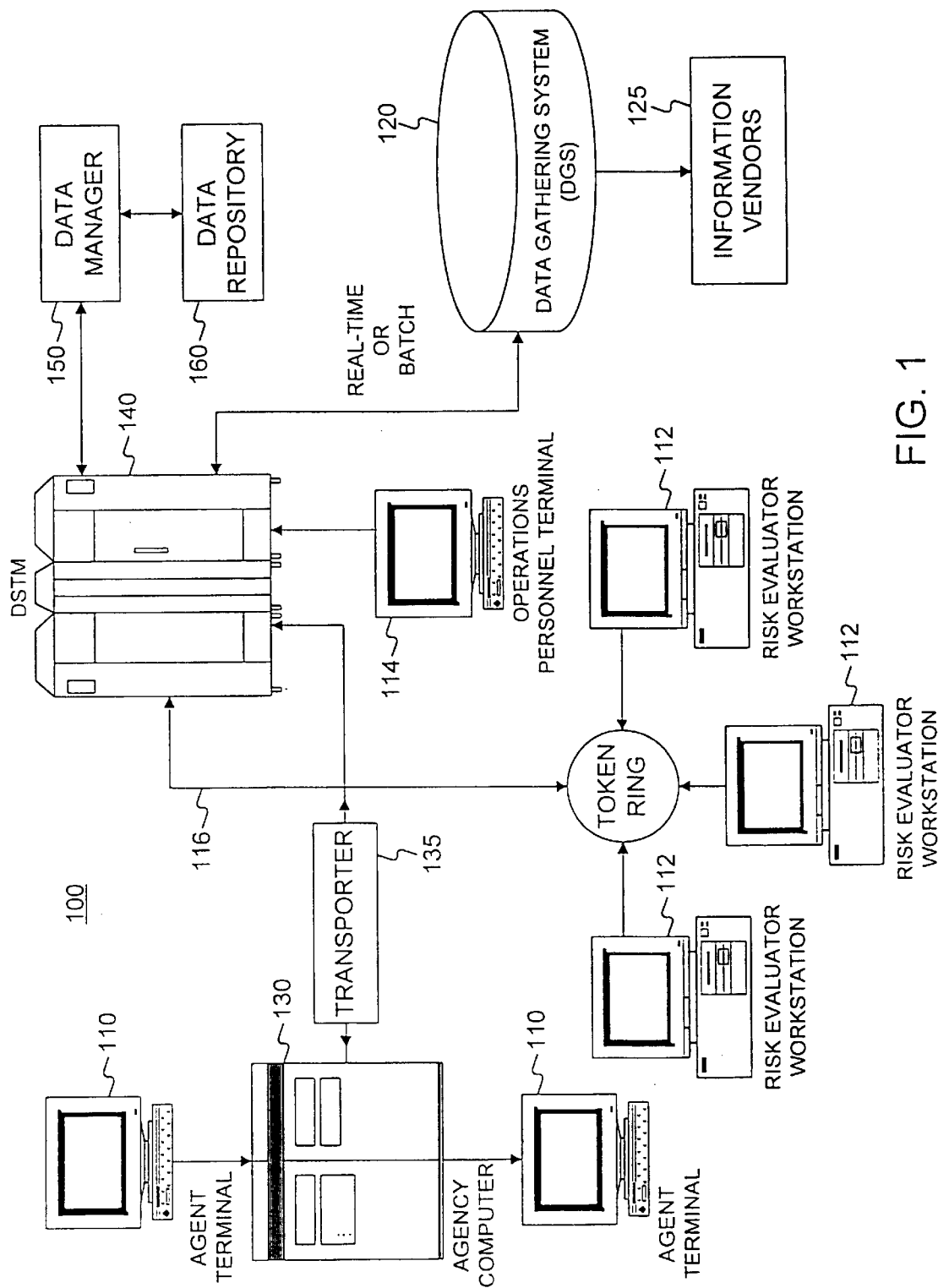
FIG. 1 is a block diagram depicting the overall system for processing insurance information according to the present invention.

Reference will now be made in detail to the construction and operation of implementations consistent with the present invention illustrated in the accompanying drawings. In those drawings, like elements and operations are designated with the same reference numerals where possible.

Systems and methods consistent with the present invention allow an insurance agent or automatic application processes to obtain information needed to process a customer's application for insurance. Information on customers may be available at external vendors, such as individual state databases, that list information about potential customers such as accident information and life status information. The present invention allows for obtaining this information in real time from the external vendors and returning the same to the automated process or the agent to allow for faster insurance application processing.

A. Data Retrieval

FIG. 1 is a block diagram 100 illustrating the general flow of data-retrieval and decision-making processing according to one embodiment of the present invention. The present invention uses a computer network to retrieve and assemble customer data for use in rendering decisions based on that data.

As FIG. 1 shows, there are four sources of requests for customer data: agents at terminals 110, risk evaluators at terminals 112, operations personnel at terminals 114, and data solutions transaction manager (DSTM) 140. All four sources may require information from external data sources to evaluate a potential insurance customer. The sources transmit their requests for such information via DSTM 140 to a data gathering system (DGS) 120 that accesses external sources of information known as information vendors 125. DSTM 140 and DGS 120 both include a processor and a memory.

There are several types of information vendors 125. For example, one information vendor may be a state agency providing motor vehicle records for the citizens of that state. Another information vendor may provide credit reports for customers nationwide.

Data requests are made by agents at terminals 110, risk evaluators at workstations 112, and operations personnel at terminal 114 by sending the request to data solutions transaction manager (DSTM) 140 either directly, through a token ring, or through transporter 135. DSTM 140 also generates data requests when performing automatic application processing. DSTM 140 formats data requests and forwards them to DGS 120.

DSTM 140, using data manager 150, maintains customer data in data repository 160. All data gathered on a customer is stored in the data repository 160 so that when additional requests are made for the same data, the data may quickly be obtained without requesting it from vendors.

B. Processing of Data Requests

Consistent with the present invention, agency computer 130 provides agents with a user interface on terminals 110 for displaying policy information and decisions, and enables the agents to interact with DSTM 140 through transporter 135. The user interface allows an agent to enter customer data into prequalification policy templates and update existing policy files, to display decision results to agents and allow them to enter customer data requests and changes to policy data, and to order any available data for a particular customer from participating information vendors.

Once an agent at agent terminal 110 completes the templates, agency computer 130 formats the customer data into policy records and transmits these files to DSTM 140. DSTM 140 sends risk evaluative decisions back to agency computer 130 through either batch processing or real-time links through transporter 135. Agency computer 130 then enters each policy into a queue associated with the agent handling that policy.

Figure 2:
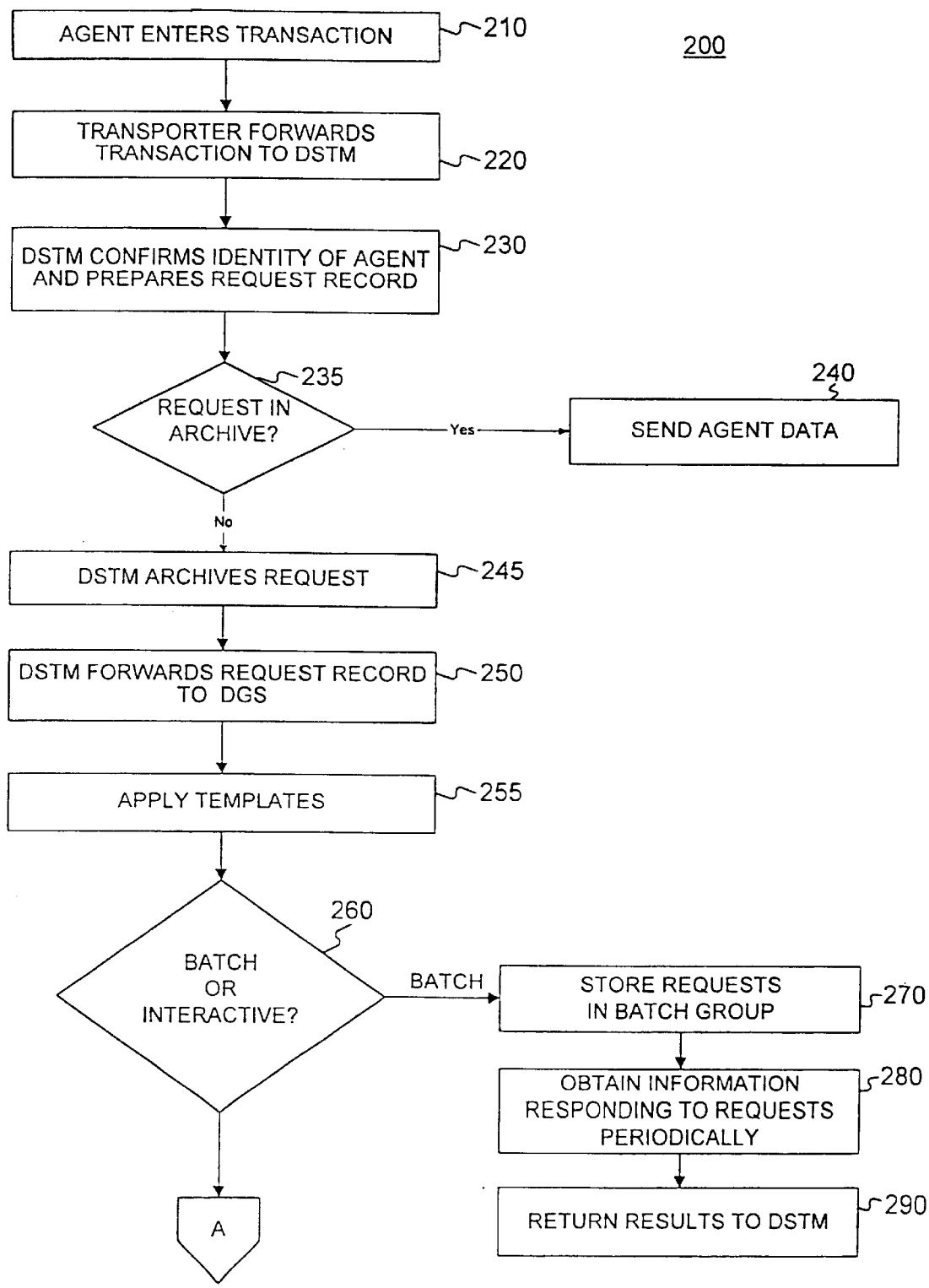
FIG. 2 is a flow chart depicting the steps for requesting insurance information from outside vendors.

FIG. 2 contains a flow chart 200 depicting information processing flow for requests for data. Although this figure refers to an agent making a request for information, requests may also be made from terminals 112, 114, or DSTM 140. An agent enters a transaction request in a template on agent terminal 110 (step 210). The transaction request includes an indication of whether the agent wants the request processed in real time or using batch processing. Transporter 135 forwards the transaction to DSTM 140 (step 220). DSTM 140 confirms the identity of the agent using an agent identifier and prepares a request record that includes an indication of whether the request should be processed in real-time or batched (step 230). Data repository 160 holds an archive of previous data requests for each customer and stores the resulting data found for each request. When a request is received DSTM 140 searches data repository 160 to determine if the information requested already exists in the data repository 160 (step 235). If so, the DSTM 140 forwards the requested data to the requester without notifying DGS 120 of the request (step 240). Otherwise, the request is archived in data repository 160 for purposes of later matching it to results of the request (step 245). DSTM 140 connects to DGS 120 and forwards the request (step 250). DGS applies a series of templates to reformat the request depending on the vendor to be queried for the data (step 255). For example, if the information available for households in the State of Texas is limited to motor vehicle records and credit reports, a template will be applied to a request from Texas which will limit the information obtained to those two categories regardless of the request made by the requester. Depending on the information requested and the state or region involved, the customer data request must be formatted to comply with the requirements of a particular information vendor. For example, a motor vehicle record request to the State of Texas must be formatted differently from a request to the State of Illinois. Similarly, a credit report request maybe formatted differently depending upon the vendor involved.

DGS 120 determines whether the request is a real-time request or a batch request (step 260). If a batch request, DGS 120 stores a group of batch requests in a batch group (step 270). DGS 120 obtains information from information vendors 125 for responding to the batch requests periodically (step 280). DGS 120 returns any resulting data obtained from the information vendors 125 to DSTM 140 for storage in the data repository 160 and distribution to the corresponding agent terminal 110 (step 290).

Figure 3:
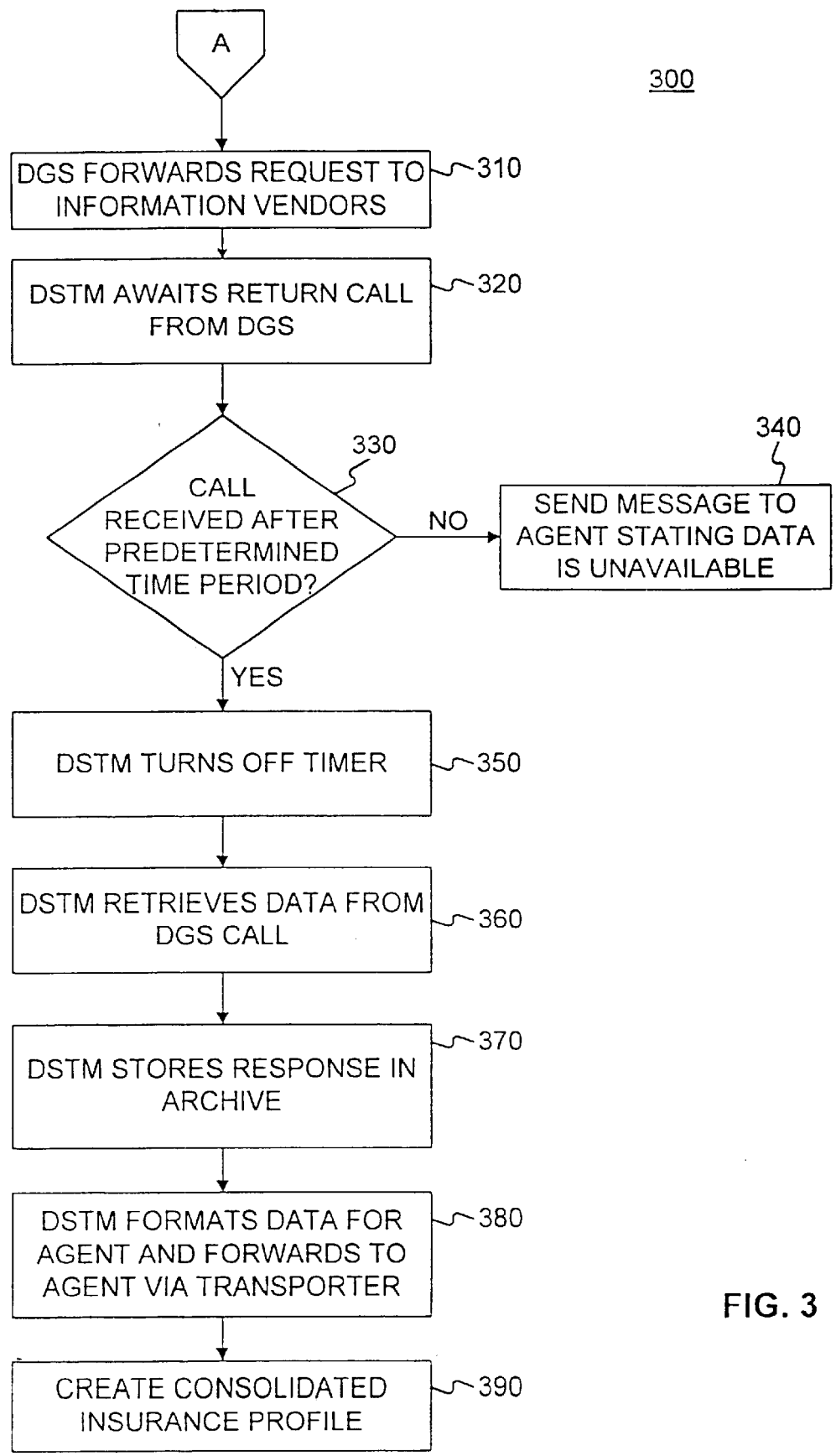
FIG. 3 is a flow chart depicting the steps for obtaining and returning the requested information.

FIG. 3 is a flowchart showing the steps 300 for processing a real time request. After DGS 120 determines that a request is interactive (step 260), DGS 120 forwards the request to the information vendors 125 (step 310). After sending the interactive request, DSTM 140 awaits a return call from DGS 120. DSTM 140 monitors whether the return call is received within a predetermined time period (step 330). If not, DSTM 140 sends a message to the corresponding agent at agent terminal 110 stating that the data requested is unavailable (step 340). If DSTM 140 receives the return call from DGS 120 within the time period, DSTM 140 turns off a timer that measures the predetermined time period (step 350). DSTM 140 retrieves the data from the call received from DGS 120 (step 360). DSTM stores the response in the archive in data repository 160 along with the request (step 370). DSTM 140 formats the data for viewing by the agent and forwards the formatted data to the agent at terminal 110 via transporter 135 (step 380). In addition to routing the received data response, DSTM 140 creates a consolidated insurance profile (step 390). This consolidated profile is a uniform compendium of all external data retrieved for a particular policy household. The consolidated profile is dynamic in that it can be automatically updated each time requested information is returned. This consolidated profile may also be viewed at any time by risk evaluators or operations personnel.

C. Automated Data Requests

Figure 4:
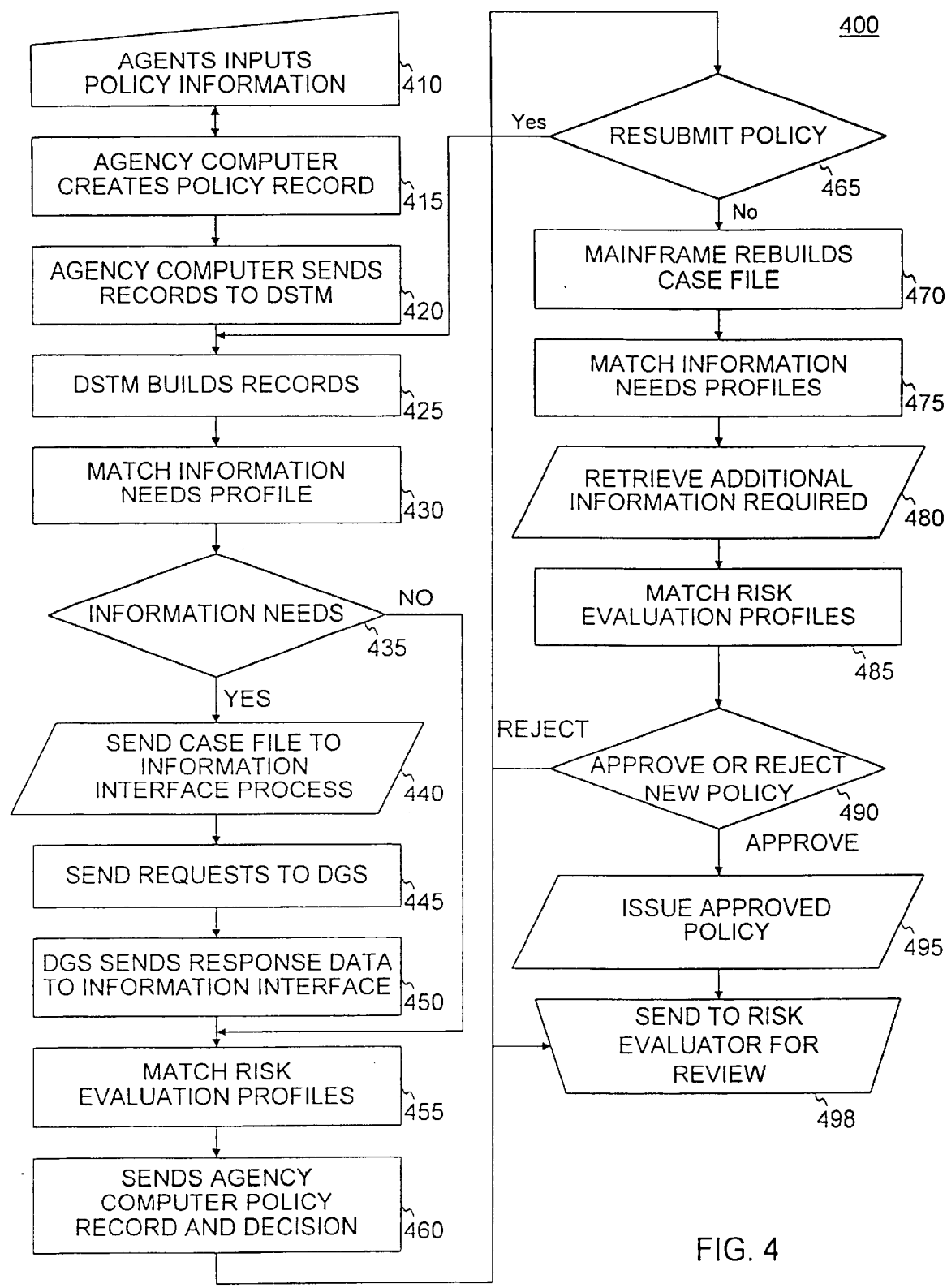
FIG. 4 is a flow chart of the steps for automatically processing an application.

FIG. 4 is a flow diagram 400 illustrating the general process flow of an automated customer data request carried out at DSTM 140.

Prior to the automated request, insurance agents provide the primary human contact with potential policy holders and obtain customer data pertinent to the desired policy. For example, in an automobile insurance policy, this customer data may include the driver's age, the type of vehicle to be insured, and the driver's driving history. An agent enters this data into an agent terminal linked to the agency computer (step 410). In response, the agency computer creates a policy record containing this data, and assigns the record a unique identification number (step 415).

Before understanding the remaining flow, it is helpful to understand the three stages of policy analysis under automated processing. First, policies undergo Prequalification Business (P.B.) analysis. If a policy is not rejected during this stage of processing, the policy is further analyzed in a second stage of analysis prior to issuance. Finally, in a third stage, existing policies undergo periodic renewal analysis.

Preferably, the agency computer sends policy records intended for analysis into DSTM 140 (step 420). DSTM 140 builds a case file corresponding to each submitted policy record (step 425).

When a case file is built, a work flow manager process operating within DSTM 140 directs the case file through a series of processes designed to perform risk assessment. Usually, the system first evaluates a case file to determine what information is needed to perform risk assessment properly. DSTM 140 uses an expert system engine to perform a series of complex pattern matchings using "profiles" of information needs (step 430). Profiles are combinations of criteria used to render a decision about customer data.

The expert system determines the information needed based on any successful profile matches (step 435). Then a work flow manager forwards the case file, as well as an indication of the needed information, to an information interface process included within DSTM 140 (step 440).

The information interface process sends customer data requests to DGS 120, to external sources of information, such as information vendors 125 as described in FIGS. 2 and 3 (step 445). DGS 120 sends data responding to the request to the information interface at DSTM 140 (step 450). The information interface of DSTM 140 automatically updates the case file with the retrieved information, and the work flow manager then directs the case file back to the risk assessment process.

The same expert system engine that determined what information was needed also performs the actual risk evaluation. The expert system matches the data in the case file to a series of risk evaluation profiles to determine the quality of the risk, to classify the risk correctly, and to generate advice for an agent (step 455). If possible, the expert system then renders a decision to accept or reject the policy according to the profile matches, and sends the agency computer the policy record and decision (step 460).

Depending on the decision made during risk assessment and the information returned to the agency computer, the agency may resubmit a policy several times for further data retrieval and risk evaluations (step 465).

In the preferred implementation consistent with this invention, the agency submits policies to DSTM 140 for final risk evaluation before issuing the policy. The final risk evaluation reevaluates the policy in light of any last minute changes made by the agency.

To perform this final evaluation, policies are communicated from the agency computer to DSTM 140. After the case file is rebuilt (step 470), the expert system matches information needs profiles with the case file (step 475). If additional information is required, DSTM 140 invokes the information interface processes to retrieve such information using DGS 120 (step 480). Finally, the expert system again matches risk evaluation profiles to the case file to render a decision (step 485).

If the expert system approves the policy during the second risk evaluation (step 490), the policy is automatically submitted for issuance (step 495). If the expert system rejects the policy, the rejected policy is directed to a risk evaluator workstation for review by a risk evaluator (step 498). The risk evaluator may then decide to confirm the decision rejecting the policy, or decide to accept the policy notwithstanding the previous decision to reject.

Figure 5:
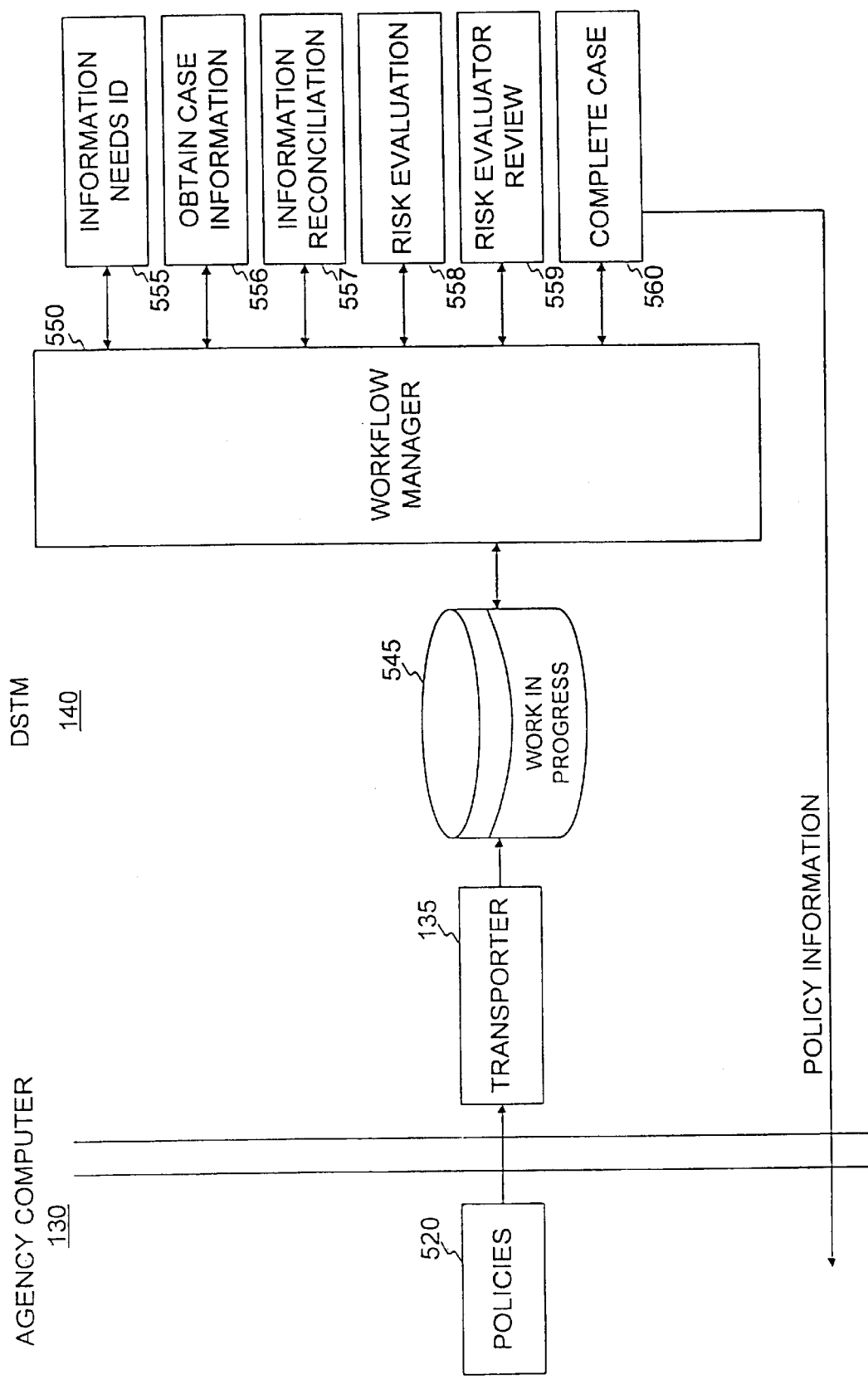
FIG. 5 is a communications diagram showing the data solutions transaction manager of FIG. 1 as configured for automated application processing.

FIG. 5 is a communications diagram 500 showing DSTM 140 as configured for automated application processing. Under automated risk evaluation, agency computer 130 sends policies 520 to DSTM 140 via transporter 135 for processing.

A work-in-progress (WIP) database 545 stores the policy information in relational database tables. Each table stores a particular piece of data for a policy and is indexed by the unique case or policy number associated with that piece of data. Thus, one particular table may store the zip codes for each policy. Several other relational database tables, not shown in FIG. 5, store profiles, statistics, and other data used by DSTM 140. Once a policy is placed in the WIP database 545, a status of the policy is set to "active."

Work flow manager process 550 directs the processing of active polices and the execution of most processes within DSTM 140. Work flow manager process 550 accesses WIP database 545 and selects all active cases for processing. Workflow manager 550 routes active cases through information needs identification (INI) subprocess 555, obtain case information subprocess 556, information reconciliation subprocess 557, risk evaluation subprocess 558, risk evaluator review subprocess 559, and complete case subprocess 560.

INI subprocess 555 determines the information needs using the same knowledge base decision-making process as is employed for risk evaluation. The difference is that decisions rendered through INI subprocess 555 concern the information required to render risk evaluations, not the risk evaluations themselves. The different results arise because the processes use different types of profiles. The decisions result from matching those profiles to the case information.

Obtain case information subprocess 556 executes information interface processes to gather all internal and external data that INI subprocess 555 determined to be required. Once this data is gathered, subprocess 556 updates the policy file in WIP database 545.

Information reconciliation subprocess 557 reconciles cases needing external data that are placed in a "pended" status in the WIP database 545 until the external data is received. Information reconciliation subprocess 557 reconciles the initial customer data provided by the agency with the data obtained in obtain case information subprocess 556. If the two sets of data cannot be reconciled, the knowledge-base engine nevertheless renders a decision, and DSTM 140 transfers the case back to agency computer 320 for further processing. This agency processing, called data "scrubbing," reconciles conflicting data. Following data scrubbing, agency computer 130 resubmits the case for evaluation by DSTM 140.

Risk evaluation subprocess 558 is performed by the knowledge base engine to determine a risk if possible for the policy. The policy may also be sent to a risk evaluator for review 559. Complete case subprocess 560 forwards a completed case to the initiating agency computer 130.

D. Conclusion

Accordingly, the systems and methods consistent with the present invention provide a faster system and method for retrieving data for either manual or automatic risk assessment.

It will be apparent to those skilled in the art that various modifications and variations can be made in the disclosed process and product without departing from the scope or spirit of the invention. Other embodiments of the invention will be apparent to those skilled in the art from consideration of the specification and practice of the invention disclosed herein. The specification and examples are exemplary only. The true scope and spirit of the invention are defined by the following claims.

What is claimed is:

1. A method of controlling a computer network to assemble data for rendering decisions based on the data, the network including a data manager having a memory, and a data gathering system coupled to vendors of data, the method comprising the steps, performed by the data manager, of:
    processing a request for data to evaluate an application; and
    invoking real time information interface processes to retrieve needed additional data through the data gathering system, the step of invoking including the substeps of
        applying a series of templates to the request,
        formatting the request according to the data vendors,
        sending formatted request to the appropriate data vendors for real time processing,
        receiving data from the data vendors in response to the formatted request in real time,
        matching the received data with the request, and
        delivering the matched data to the data manager.

2. The method of claim 1 further including the steps of:
    archiving the request at the data manager; and
    corresponding the matched data at the data manager with the archived request.

3. The method of claim 1 wherein the invoking step further includes the step of:
    storing data received from the vendors in the archive file.

4. The method of claim 2 further including the step of:
    checking the archive for the requested data before invoking the information interface processes.

5. The method of claim 1 further including the step of:
    determining whether the data gathering system returns matched data within a predetermined period of time.

6. The method of claim 5 further including the step of:
    informing the requester that the requested data is unavailable when the matched data is not returned within a predetermined period of time.

7. The method of claim 1 wherein the step of processing a request includes the substeps of
    automatically processes applications, and
    generating the request for data when needed to process an application.

8. A system for assembling data to render decisions based on the data, the system including:
    a data manager having a memory;
    means for processing a request for data to evaluate an application;
    a data gathering system coupled to vendors of data;
    means for invoking real time information interface processes to retrieve needed additional data through the data gathering system;
    means for applying a series of templates to the request;
    means for formatting the request according to the data vendors;
    means for sending formatted request to the appropriate data vendors for real time processing;
    means for receiving data from the data vendors in response to the formatted request in real time;
    means for matching the received data with the request; and
    means for delivering the matched data to the data manager.

9. The system of claim 8 further including:
    means for archiving the request at the data manager; and
    means for corresponding the matched data at the data manager with the archived request.

10. The system of claim 9 wherein the means for invoking further includes:
    means for storing data received from the vendors in the archive file.

11. The system of claim 9 further including:
    means for checking the archive for the requested data before invoking the information interface processes.

12. The system of claim 8 further including:
    means for determining whether the data gathering system returns matched data within a predetermined period of time.

13. The method of claim 12 further including:
    means for informing the requester that the requested data is unavailable when the matched data is not returned within a predetermined period of time.

14. The method of claim 8 wherein the data manager includes:
    means for automatically processing applications, and
    means for generating the request for data when needed to process an application.

* * * * *